United States Patent
Lashley et al.

(10) Patent No.: US 7,640,278 B2
(45) Date of Patent: Dec. 29, 2009

(54) SYSTEM AND METHOD FOR IMPLEMENTING A PARTIAL-BLOCKING CONSISTENCY POINT IN A DATABASE

(75) Inventors: Scott David Lashley, Portland, OR (US); John Frederic Miller, Lake Oswego, OR (US); Clarence Madison Pruet, Flower Mound, TX (US); Daniel Alan Wood, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/427,203

(22) Filed: Jun. 28, 2006

(65) Prior Publication Data

US 2008/0005191 A1 Jan. 3, 2008

(51) Int. Cl.
*G06F 12/00* (2006.01)
(52) U.S. Cl. .................. 707/203; 707/101
(58) Field of Classification Search ........... 707/202, 707/204, 203, 101; 709/219; 714/16
See application file for complete search history.

(56) References Cited

U.S. PATENT DOCUMENTS

| | | | |
|---|---|---|---|
| 5,293,613 A | | 3/1994 | Hayden et al. |
| 6,338,147 B1 | | 1/2002 | Meth et al. |
| 6,351,754 B1 | | 2/2002 | Bridge, Jr. et al. |
| 6,678,704 B1 | | 1/2004 | Bridge, Jr. et al. |
| 7,024,467 B2 * | | 4/2006 | Rosensteel et al. .......... 709/219 |
| 7,467,265 B1 * | | 12/2008 | Tawri et al. ................. 711/161 |
| 2003/0061537 A1 * | | 3/2003 | Cha et al. ..................... 714/16 |
| 2003/0200262 A1 * | | 10/2003 | Enomoto .................... 709/205 |
| 2005/0034014 A1 | | 2/2005 | Moser et al. |
| 2006/0212496 A1 * | | 9/2006 | Romine et al. .............. 707/204 |

OTHER PUBLICATIONS

Premkumar Devanbu, Mark A. Jones, the Use of Description Logics in KBSE Systems, Apr. 1997, ACM, vol. 6, No. 2, pp. 141-172.*
IEEE, no matched results, Aug. 1, 2009, p. 1.*
Roberto Baldoni, rachid guerraoui, Ron R. Levy, Unconscious Eventual Consistency with gossips, 2006, google.com, pp. 65-81.*
F. Quaglia, et al., "Modeling and Optimization of Non-Blocking Checkpointing for Optimistic Simulation on Myrinet Clusters", International Conference on supercomputing; Proceedings of the 17th annual international conference on Supercomputing, 2003.

* cited by examiner

*Primary Examiner*—Mohammad Ali
*Assistant Examiner*—Donald Lawson
(74) *Attorney, Agent, or Firm*—Patterson & Sheridan, LLP (57) ABSTRACT

A partial-blocking consistency point system identifies transaction updates with a consistency point ID associated with a consistency point sequence number, records consistency point data that identify a location of the partial-blocking consistency point, flushes to a non-volatile storage the transaction updates identified with the consistency point sequence number without blocking transaction activity, and hardens to the non-volatile storage the recorded partial-blocking consistency point so that data associated with the recorded partial-blocking consistency point can be recovered. The consistency point sequence number is incremented each time the partial-blocking consistency point is recorded to uniquely identify the partial-blocking consistency point and transaction updates associated with the partial-blocking consistency point. The transaction updates identified with the consistency point sequence number are processed to improve efficiency of the flushing of the transaction updates.

16 Claims, 5 Drawing Sheets

SYSTEM AND METHOD FOR IMPLEMENTING A PARTIAL-BLOCKING CONSISTENCY POINT IN A DATABASE

FIELD OF THE INVENTION

The present invention generally relates to the field of data protection and backup, and in particular, to generating a consistency point or checkpoint within a data log to identify data to be recovered in the event of a failure.

BACKGROUND OF THE INVENTION

In conventional database systems, transactions such as update, delete, write, etc. are written to volatile memory. Periodically, the transactions and data on the volatile memory are moved to non-volatile storage such as a disk. When the transactions or data are moved from volatile memory to non-volatile storage, the data and transactions are in a state of flux. Rather than forcing every transaction to non-volatile storage immediately after a transaction is completed, transactions are written to a log (i.e., logged) on a storage device. These transactions are logged to the storage device as the transactions are occurring so that, in the event of a system failure, the log can be replayed to redo or restore the transactions, returning the database system to a state consistent with the state of the database system at the time of the failure.

To facilitate restoration or logical recovery of a database system, the database system generates a consistency point, also referenced as a checkpoint. A consistency point is a point in time in the log at which a known and consistent state for the database system can be established. Typically, a consistency point involves recording to non-volatile storage (e.g., a disk) a certain amount of information such that if a failure occurs, the database system can restart at that established consistency point or can achieve a consistent state based on that established consistency point. This information comprises data associated with on-going processing and a record of the consistency point event. In a database, the data associated with on-going processing is transaction data; in other applications the data associated with on-going processing is known as message data, registers, etc.

A purpose of a consistency point is to periodically move forward in the log a logical recovery restart point for the database system. In the absence of consistency points, the database system is required to process all the transactions in the log recorded since the system was restarted, if a failure were to occur.

Conventional recovery schemes for database systems comprise a full-blocking consistency point and a non-blocking or "fuzzy" consistency point. Although these conventional recovery schemes have proven to be useful, it would be desirable to present additional improvements.

The full-blocking consistency point comprises a "hard" consistency point that writes out all dirty pages from the buffer pool. The full-blocking consistency point refers to the logging of additional information, and is often referred to as the undo log or physical log, which includes a physical logging of original images of all pages modified between consistency points such that, after a crash, the system can be restored to a physically consistent point that matches the state of the system at the completion of the last consistency point prior to a failure. With the system restored to the physically consistent point of the last consistency point, transaction recovery only has to apply those log records occurring after the last consistency point. From a recovery point of view, the full-blocking consistency point is efficient compared to conventional consistency points because all the data associated with the on-going processing is established at the same point in time, allowing an efficient restart of a system after failure.

While a full-blocking consistency point is simple, it suffers from transaction disruption and administration complexity. Transaction disruption occurs because users are blocked from performing update transactions while the buffer pool is being flushed. It is not uncommon to see systems that have been blocked for several minutes. Administration complexity occurs because the disruption, during which updates are blocked, can be quite lengthy. A common source of administrative work is attempting to configure the system to reduce the number to dirty pages at consistency point time, or to move data around to balance I/O of the restoration so the restoration can be performed faster, reducing the duration of the transaction disruption.

A fuzzy consistency point stops processing briefly to record a consistency point event. To enable the system to write the consistency point event, application data is flushed to stable storage periodically. Therefore, the fuzzy consistency point requires the ability to establish a consistent point for all the applications running. Typically, there is some partial-blocking mechanism that is able to record to stable storage each application state individually. Consequently, there may be more than one restart point, making the system restart point "fuzzy". From the application point of view, the fuzzy consistency point is efficient compared to conventional consistency points because the blocking period is very short. The fuzzy consistency point is inefficient for establishing a consistent point because multiple application consistent points are required.

A recovery scheme comprising a fuzzy consistency point does not write all dirty pages from the buffer pool. Because not all dirty pages are written, transaction recovery starts at a point associated with the oldest dirty page and conditionally applies log records based on whether a page on disk is newer than the log record. While a fuzzy consistency point is fast, the fuzzy consistency point suffers from complexity, a slow recovery time, and complex I/O patterns that lead to a lack of predictability in recovery time.

The conventional approach comprising the fuzzy consistency point is complex. A large amount of code is associated with conditionally skipping the replay of the various log record types. Further complexity occurs if there are side effects such that the replay of a log record affects more than just the page directly referenced. If the page is newer than the log record, the reapplication of the activity to the page can be skipped; however, the side effects may need to be redone. Furthermore, while an approach comprising the fuzzy consistency point is not required to flush pages, code is included for examining the entire buffer pool just to find the oldest page from which logical recovery starts, adding to system complexity.

Recovery time is slow for a conventional approach comprising a fuzzy consistency point. Because logical recovery starts at an arbitrary point associated with the oldest unwritten page, the system often processes much more of the logical log than an approach that simply starts with log records after the last consistency point. Further, because the periodic fuzzy consistency points do not reduce the number of dirty pages to zero, additional pages require redo. Moreover, fuzzy consistency points do not flush the buffer pool. Both fuzzy and full blocking checkpoints aim at reducing the number of dirty buffers, for different reasons. Full blocking checkpoints aim at less dirty buffers to reduce the blocking during the checkpoint. Fuzzy checkpoints aim at reducing the dirty buffers to shorten recovery time by moving the restart point forward in the log. The I/O flushing patterns for blocking consistency points and non-blocking (fuzzy) consistency points are significantly different.

While recovery in a system using fuzzy consistency points is in general slower, recovery can often be "much" slower. Additional recovery time is required based on the amount of extra processing required. Extra processing is required if a particularly old page was present when a crash occurred. Many of the pages associated with the older transactions that may have already been flushed to disk but fuzzy checkpoint recovery processing, must at least check the page to see if the transaction has already been applied leading to unnecessary I/Os. While customers do not like to wait for recovery, they especially do not like being unable to predict when the system recovery is complete or being surprised by restart times that are occasionally much longer than normal.

A method of consistency point processing is desired that allows transactions to occur while the consistency point is being processed, yet provides the recoverability performance of a full-blocking consistency point. What is therefore needed is a system, a computer program product, and an associated method for implementing a partial-blocking consistency point in a database. The need for such a solution has heretofore remained unsatisfied.

SUMMARY OF THE INVENTION

The present invention satisfies this need, and presents a system, a computer program product, and an associated method (collectively referred to herein as "the system" or "the present system") for implementing a partial-blocking consistency point in a database.

The present system identifies transaction updates with a consistency point ID associated with a consistency point sequence number, records a plurality of consistency point data that identify a location of the partial-blocking consistency point associated with the consistency point sequence number, flushes to a non-volatile storage the transaction updates identified with the consistency point sequence number without blocking transaction activity, and hardening to the non-volatile storage the recorded partial-blocking consistency point so that a plurality of data associated with the recorded partial-blocking consistency point can be recovered.

The consistency point sequence number is incremented each time the partial-blocking consistency point is recorded to uniquely identify the partial-blocking consistency point and transaction updates associated with the partial-blocking consistency point. The transaction updates identified with the consistency point sequence number are processed to improve efficiency of the flushing of the transaction updates.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
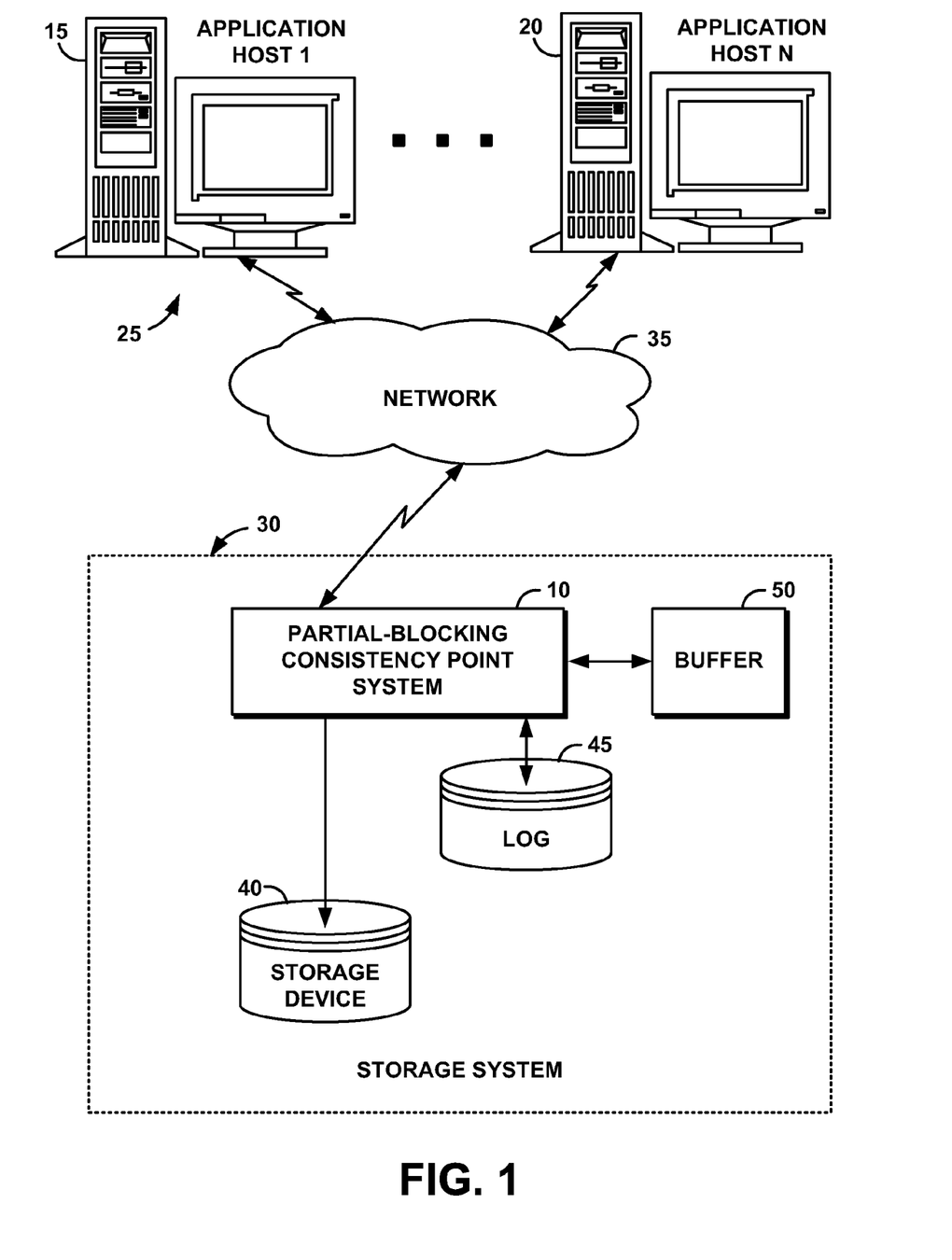
FIG. 1 is a schematic illustration of an exemplary operating environment in which a partial-blocking consistency point system of the present invention can be used.

FIG. 1 portrays an exemplary overall environment in which a system, a service, a computer program product, and an associated method (the "system 10") for implementing a partial-blocking consistency point in a database according to the present invention may be used. System 10 comprises a software programming code or a computer program product that is typically embedded within, or installed on a computer, a switching device, or any layer or point residing between hosts and storage devices. For example, system 10 can be installed in a virtualization file system, a virtualization layer, or a virtualization storage-switching device. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which comprises but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk—read only memory (CD-ROM), compact disk—read/write (CD-R/W) and DVD.

A data processing system suitable for storing and/or executing program code comprise at least one processor coupled directly or indirectly to memory elements through a system bus. The memory elements can comprise local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Hosts, such as an application host 1, 15, through an application host N, 20, (collectively referenced as application hosts 25) access a storage system 30 through a network 35. The storage system 30 comprises a non-volatile storage device such as storage device 40. While system 10 is described in terms of network 35, application hosts 25 may also access the storage system 30 and system 10 locally rather than remotely.

The storage system 30 further comprises a log 45 and a buffer 50. Log 45 and buffer 50 comprise (or alternatively form part of) a volatile memory. The application hosts 25 perform a transaction such as modifying, deleting, or adding data stored in storage device 40 System 10 records the transaction in the buffer 50 (interchangeably referenced herein as the buffer pool 50) and logs the transaction in log 45. In summary, the present invention uses two logs, one log to record transactions, typically referred to as the redo log, and another log to record physical images of pages prior to updates being applied, typically referred to as the physical log (or undo log). Certain databases may combine the two logs into a single log and other databases may separate them into two distinct logs.

Figure 2:
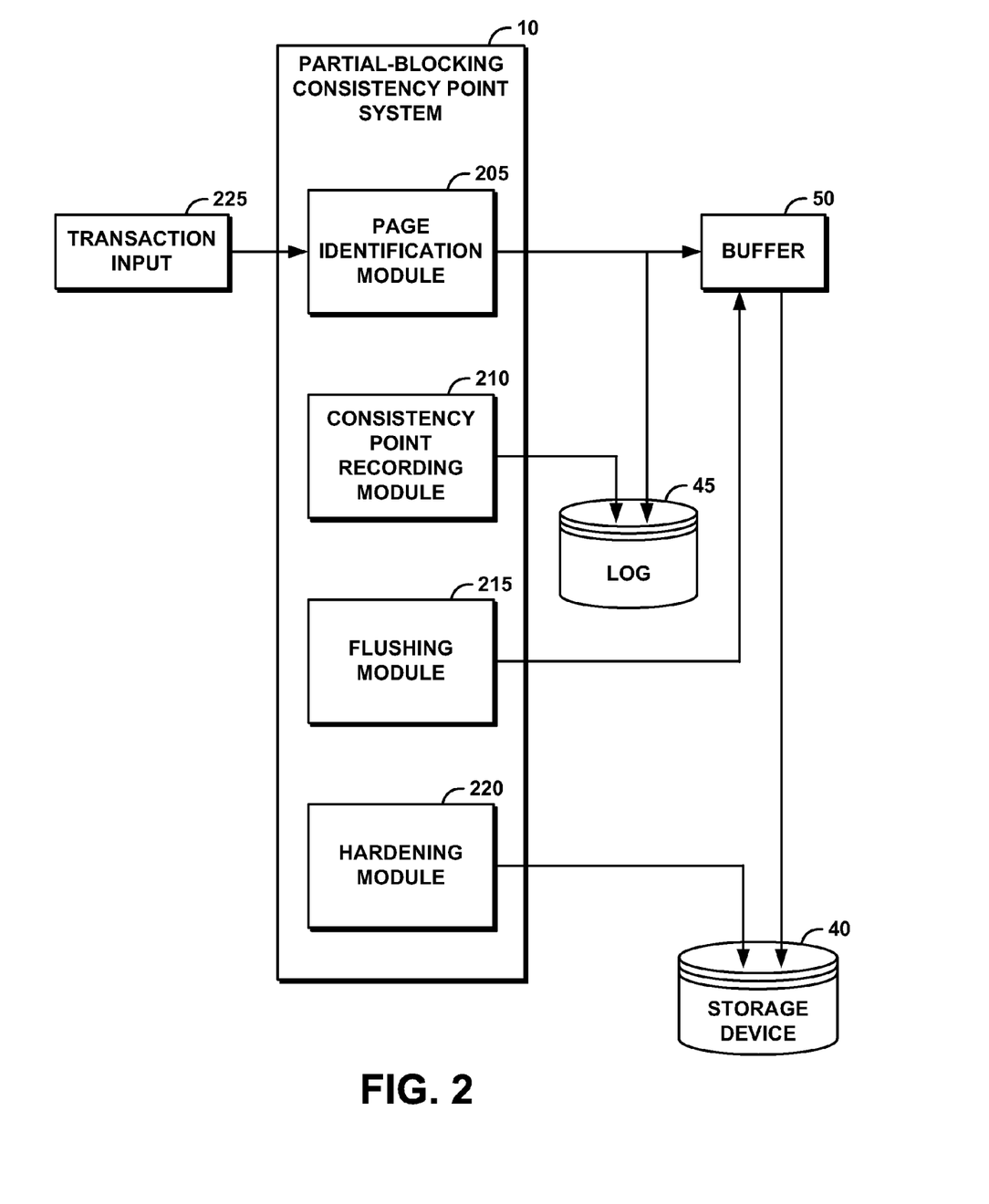
FIG. 2 is a block diagram of the high-level architecture of the partial-blocking consistency point system of FIG. 1.

FIG. 2 illustrates a high-level hierarchy of system 10. System 10 comprises a page identification module 205, a consistency point recording module 210, a flushing module 215, and a hardening module 220. Given a transaction input 225, the page identification module 205 associates pages in the buffer 50 with a partial-blocking consistency point via a consistency point sequence number. The consistency point recording module 210 briefly blocks processing by the application hosts 25 to record a partial-blocking consistency point, then allows all processing by the application hosts 25 to continue. The flushing module 215 flushes from the buffer 50 to the storage device 40 all transaction updates that have occurred prior to the recording of the partial-blocking consistency point. The hardening module 220 hardens to the storage device 40 the recorded partial-blocking consistency point.

By not blocking update transactions, system 10 exhibits the unobtrusive characteristics of fuzzy checkpoints while providing the simplicity, recovery performance, and predictability or a full-blocking consistency point. System 10 establishes a partial-blocking consistency point that is a physical consistency point similar to that of a hard consistency point while allowing updates to occur while the processing of the partial-blocking consistency point is in progress. System 10 controls processing of pages being modified, either newly modified or re-modified, while the original set of modified dirty pages in the buffer 50 are written to the storage device 40.

In the following exemplary scenario, a consistency point sequence number (CPSN) N is being processed, and the system is incremented to CPSN=N+1. During checkpoint processing. If a non-modified page is modified, it gets stamped with a CPSN=N+1. If a modified page is updated and the CPSN<N+1, we know that this page must be flushed as part of the checkpoint processing but it has not been flushed yet. So, the page is flagged with a special flag to instruct the checkpoint processing to be flushed and the page is stamped with N+1. As a result, system 10 tracks page modifications to make certain that all the required pages for the consistency point are flushed to disk.

Compared to conventional consistency point systems, system 10 reduces the quiescent time that transactions experience while waiting for a consistency point to complete.

System 10 assumes that all transactions from the start of the partial-blocking consistency point, known as the consistency point restart position (CPR), are applied and no log records in log 45 are skipped.

In one embodiment, each transaction comprises a series of critical sections. Each critical section comprises a set of operations: a physical log of a page, a logical log of operations, and a modification of buffer 50. Log 45 comprises the physical log and the logical log. The physical log of a page comprises an undo log. The logical log of operations comprises a redo log. The modification of buffer 50 comprises actual page updates. A sequence of operations within a critical section remains the same. There can be more than one invocation of a set of operations inside the critical section, but the sequence for any given page remains the same. Write ahead logging rules apply, indicating that the modified page cannot be flushed to the storage device 40 until the physical log and logical log are flushed.

Figure 3:
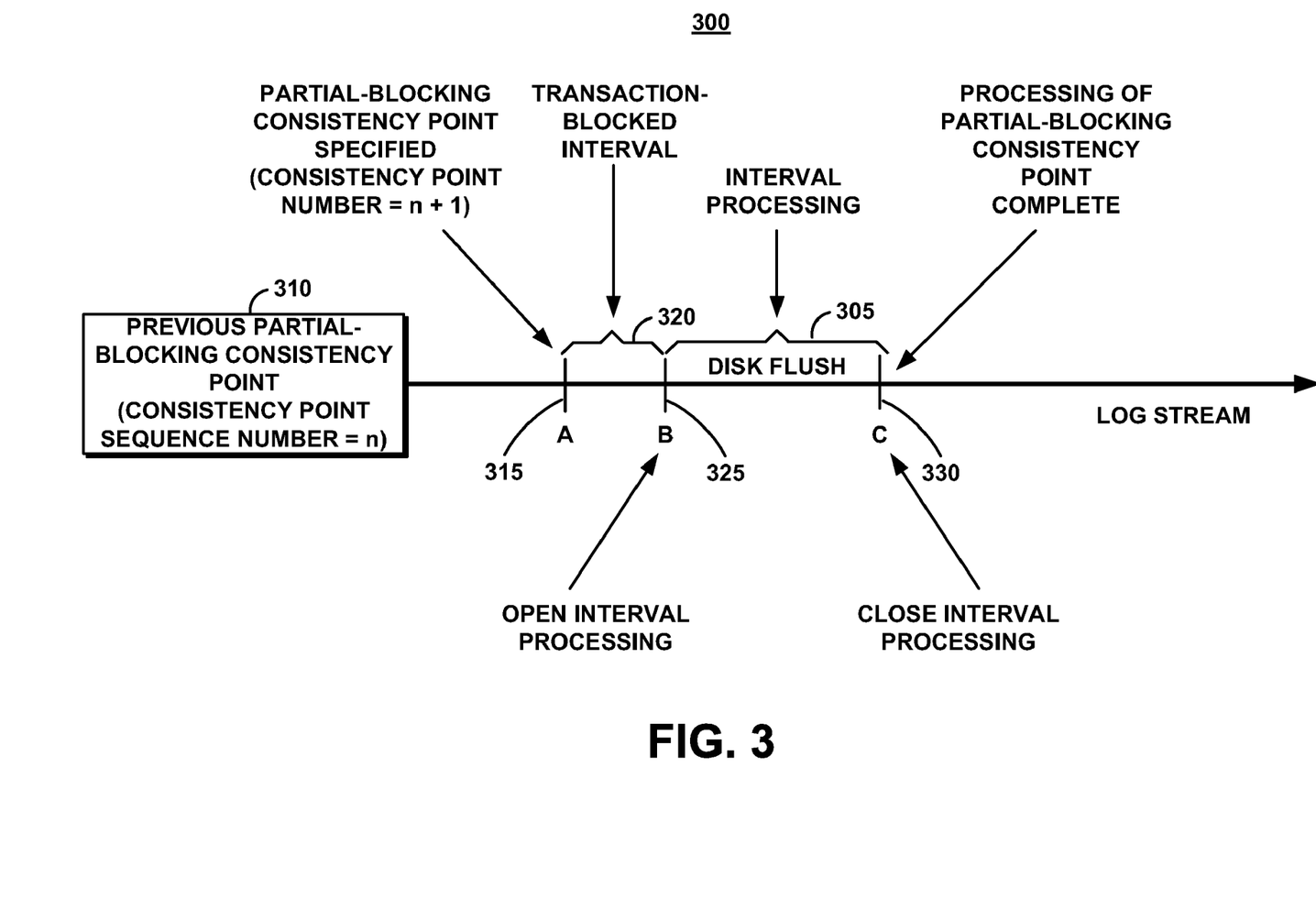
FIG. 3 is a diagram of an exemplary log stream illustrating performance of the partial-blocking consistency point system of FIGS. 1 and 2.

FIG. 3 shows an exemplary log stream 300 illustrating performance of system 10. System 10 uses an interval processing 305 to identify which data to flush to the storage device 40 to establish a single restore point for applications 25. Pages to be flushed from buffer 50 to the storage device 40 are referenced to a previous partial-blocking consistency point 310. The partial-blocking consistency point 310 comprises a consistency point sequence number of "n". The page identification module 205 identifies transactions written to the buffer after the partial-blocking consistency point 310 with a consistency point ID set at "n+1".

At a point A, 315, the consistency point recording module 210 specifies in the log 45 a partial-blocking consistency point. There are two recording actions that take place when a consistency point is recorded. The list of open transactions is recorded to non-volatile storage (the log) at the time of the consistency point. The log position of the list of open transactions is recorded to volatile memory. The restart point of the physical log is recorded to non-volatile memory. Together, these log positions form the recovery restart point.

The consistency point recording module 210 increments the consistency point sequence number by 1, to "n+2". The page identification module 205 identifies transactions written to buffer 50 after the specified partial-blocking consistency point with the consistency point sequence number of "n+2". Consequently, any transactions occurring after the partial-blocking consistency point is specified are associated with a next partial-blocking consistency point with consistency point sequence number "n+2".

While specifying the partial-blocking consistency point, the consistency point recording module 210 briefly blocks transactions, as indicated by a transaction-blocked interval 320. At a point B, 325, the consistency point recording module 210 allows transactions by applications 25. The page identification module 205 associates allowed transactions with the incremented consistency point sequence number (n+2). At point B, 325, the consistency point recording module 210 opens the interval processing 305 and the flushing module 215 initiates disk flushing.

Disk flushing comprises flushing to the storage device 40 all the pages in the buffer 50 required for the partial-blocking consistency point recorded at point A, 315, i.e., those pages that have a consistency point ID of "n+1". If a page in buffer 50 is updated after the partial-blocking consistency point is recorded at point A, 315, the flushing module does not flush that page to the storage device 40 because that update is not required for the consistency point. In the event of a recovery, that updated page is restored from the log 45 during log recovery.

Because the consistency point sequence number identifies the pages in the buffer 50, the flushing module 215 performs an efficient non-random I/O. In one embodiment, the flushing module 215 orders the pages in buffer 50 prior to flushing the pages in buffer 50 to the storage device 40. By identifying the pages in the buffer 50 that are flushed by the flushing module 215, an administrator is able to tune system 10 to perform efficiently and meet the policies of an application such as a database using system 10.

Another embodiment refers to the non-ordering of the pages. Some storage mechanisms have a physical configuration different than what is exposed to the server as storage. For instance, a SAN or NAS device may appear as a single disk. It may contain several disks with a large memory cache within the storage device (EMC, IBM Shark). In this embodiment, the pages are readily identifiable and therefore allow either ordering of the I/O as well as the ability to submit, for example, thousands of I/Os in a single call to the I/O subsystem which takes advantage of new I/O APIs. In essence, according to this embodiment, the easily identifiable pages allow for more efficient and more flexible I/O. Another alternative embodiment could similarly be effected for the non-ordered I/O.

When all pages in the buffer 50 associated with the partial-blocking consistency point (i.e., all pages in buffer 50 with the consistency point ID of "n+1") have been flushed to the storage device 40, the flushing module 215 closes the interval processing at point C, 330. At point C, 330, the hardening module 220 hardens the partial-blocking consistency data transferred to the storage device 40 and processing of the partial-blocking consistency point is complete.

Figure 4:
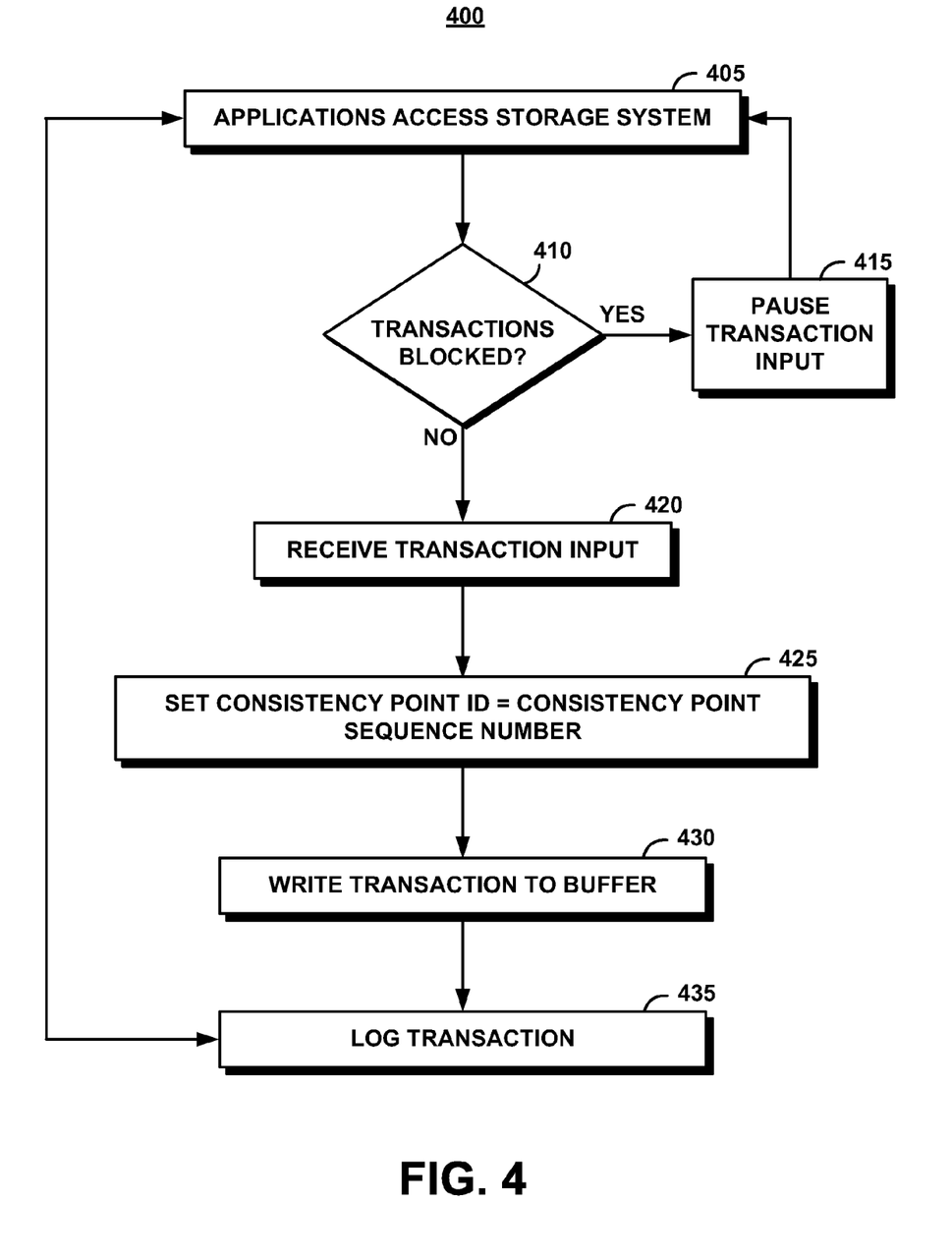
FIG. 4 is a process flow chart illustrating a method of operation of the partial-blocking consistency point system of FIGS. 1 and 2 in applying a consistency point ID to pages in a buffer.

FIG. 4 is a process flow chart illustrating a method of operation of system 10 in applying a consistency point ID to pages in buffer 50. Applications 25 access the storage system 30 (step 405). If transactions are blocked (i.e., a partial-blocking consistency point is being recorded) (decision step 410), transaction input 225 is paused (step 415) until transactions are no longer blocked (decision step 410).

The page identification module 205 receives transaction input 225 (step 420). The page identification module 205 sets the consistency point ID of the page equal to the consistency point sequence number (step 425). The transaction is written to buffer (step 430) and logged (step 435). When a transaction is applied to a page, the page in buffer 50 is also marked as modified.

Figure 5:
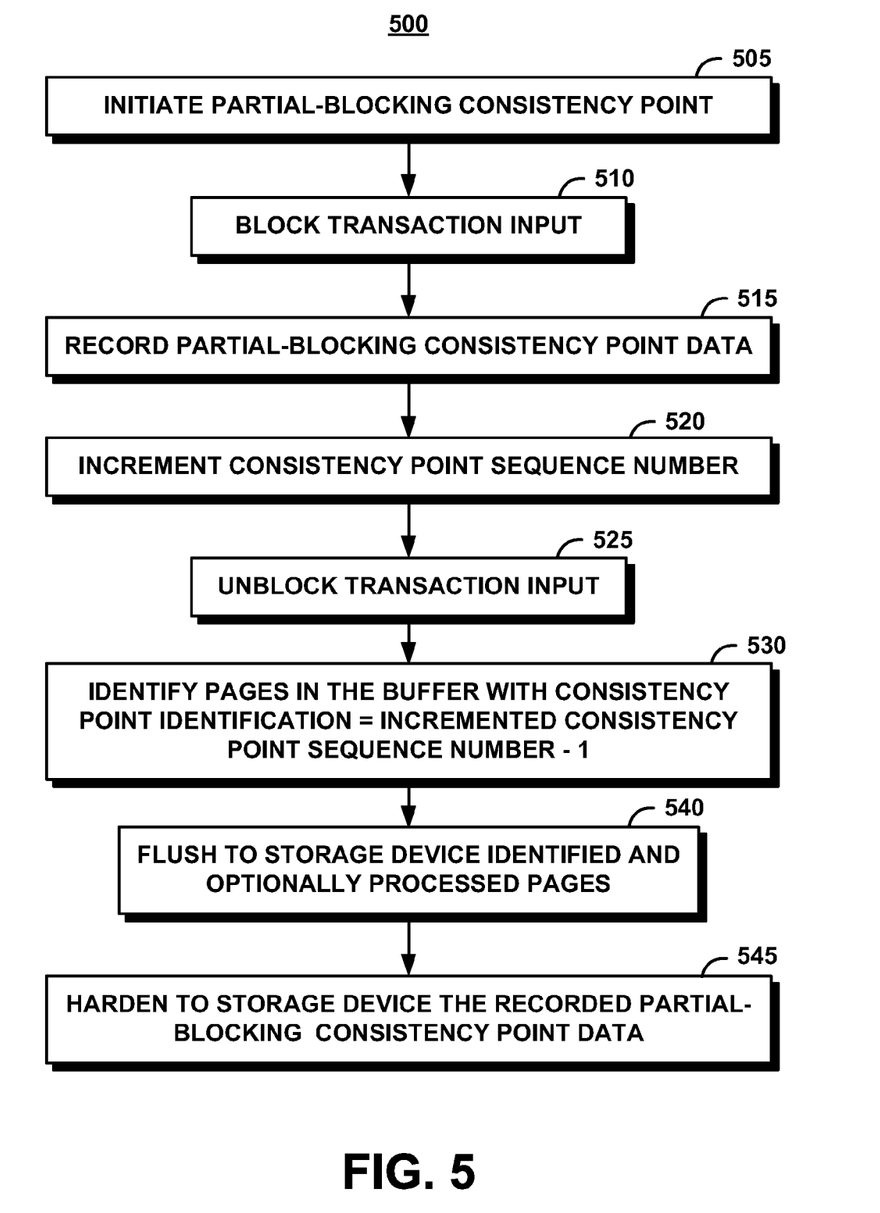
FIG. 5 is a process flow chart illustrating a method of operation of the partial-blocking consistency point system of FIGS. 1 and 2 in generating a partial-blocking consistency point.

FIG. 5 is a process flow chart illustrating a method of operation of system 10 in generating a partial-blocking consistency point. The consistency point recording module 210 initiates a partial-blocking consistency point (step 505). The consistency point recording module 210 blocks transaction input 225 (step 510). The consistency point recording module 210 records partial-blocking consistency point data (step 515). Recording the partial-blocking consistency point data comprises writing the partial-blocking consistency point data to log 45 and recording into memory the position of a physical location of the partial-blocking consistency point in the log.

The consistency point recording module 210 increments the consistency point sequence number (step 215) and unblocks transaction input (step 220). System 10 uses the consistency point sequence number to determine the requirements for modifying subsequent pages once processing of the partial-blocking consistency point begins.

The flushing module 215 identifies pages in the buffer 50 that are marked modified and with a consistency point ID. It is possible that a page that was modified during the interval might have been flushed prior to a checkpoint. System 10 will preemptively flush modified pages to storage outside of the checkpoint flush module to avoid running out of buffers for page faults. This flushing could leave pages that had transactions applied during the checkpoint interval; however, because these pages have already been flushed to disk, they do not need to be flushed again. The consistency point ID equals the incremented consistency point sequence number—1 (step 530). Every page that has been modified by a transaction is marked as modified (or dirty). In other terms, the state of the page changes to "modified". When a page is flushed to disk, it is unmarked, or its state is changed to "not modified". The pages flushed to storage by module 215 change the state of pages to "not modified". The flushing module 215 flushes to the storage device 40 the identified and optionally processed pages (step 540). The hardening module hardens to the storage device 40 the recorded partial-blocking consistency data (step 545).

If a failure occurs prior to completion of the partial-blocking consistency point, restoration and crash recovery begins with the previous partial-blocking consistency point record in the reserved pages since the partial-blocking consistency point record has not been completed.

It is to be understood that the specific embodiments of the invention that have been described are merely illustrative of certain applications of the principle of the present invention. Numerous modifications may be made to the system and method for implementing a partial-blocking consistency point in a database described herein without departing from the spirit and scope of the present invention. In one exemplary embodiment, system 10 processes one consistency point at a time. The next consistency point does not start until the previous consistency point is completed.

What is claimed is:

1. A processor-executable method of implementing a partial-blocking consistency point in a database system, comprising:

identifying a plurality of transaction updates with a consistency point ID associated with a consistency point sequence number;

recording a plurality of consistency point data that identify a location of the partial-blocking consistency point associated with the consistency point sequence number;

incrementing the consistency point sequence number;

flushing, to a non-volatile storage, the transaction updates identified with the consistency point sequence number, without blocking transaction activity;

while flushing the transaction updates identified with the consistency point sequence number:

receiving at least a first transaction update, wherein the first transaction update modifies a fist page not modified prior to the record of the consistency point data of the partial-blocking consistency point, stamping the first page with the incremented consistency point sequence number, receiving at least a second transaction update, wherein the second transaction update modifies a second page previously modified prior to the recording of the consistency point data of the partial-blocking consistency point, flagging the second page to be flushed as part of flushing the transaction updates identified with the consistency point sequence number, and stamping the second page with the incremented consistency point sequence number; and hardening, to the non-volatile storage, the recorded partial-blocking consistency point so that a plurality of data associated with the recorded partial-blocking consistency point can be recovered.

2. The method of claim 1, wherein hardening the recorded partial-blocking consistency point includes allowing the transaction activity to proceed without interruption.

3. The method of claim 1, wherein incrementing the consistency point sequence number includes uniquely identifying the partial-blocking consistency point.

4. The method of claim 1, wherein incrementing the consistency point sequence number includes uniquely identifying the transaction updates associated with the partial-blocking consistency point.

5. The method of claim 1, further comprising processing the transaction updates identified with the consistency point sequence number, in order to improve a flushing efficiency of the transaction updates.

6. A computer-readable storage medium containing a program, which, when executed, configures a processor to perform an operation for implementing a partial-blocking consistency point in a database system, the operation comprising:
identifying a plurality of transaction updates with a consistency point ID associated with a consistency point sequence number;
recording a plurality of consistency point data that identify a location of the partial-blocking consistency point associated with the consistency point sequence number;
incrementing the consistency point sequence number
flushing, to a non-volatile storage, the transaction updates identified with the consistency point sequence number, without blocking transaction activity;
while flushing the transaction updates identified with the consistency point sequence number:
receiving at least a first transaction update, wherein the first transaction update modifies a fist page not modified prior to the recording of the consistency point data of the partial-blocking consistency point,
stamping the first page with the incremented consistency point sequence number,
receiving at least a second transaction update, wherein the second transaction update modifies a second page previously modified prior to the recording of the consistency point data of the partial-blocking consistency point,
flagging the second page to be flushed as part of flushing the transaction updates identified with the consistency point sequence number, and
stamping the second page with the incremented consistency point sequence number; and
hardening, to the non-volatile storage, the recorded partial-blocking consistency point so that a plurality of data associated with the recorded partial-blocking consistency point can be recovered.

7. The computer-readable storage medium of claim 6, wherein hardening the recorded partial-blocking consistency point includes allowing the transaction activity to proceed without interruption.

8. The computer-readable storage medium of claim 6, wherein the operation further comprises incrementing the consistency point sequence number each time the partial-blocking consistency point is recorded.

9. The computer-readable storage medium of claim 6, wherein incrementing the consistency point sequence number includes uniquely identifying the transaction updates associated with the partial-blocking consistency point.

10. The computer-readable storage medium of claim 6, wherein the operation further comprises processing the transaction updates identified with the consistency point sequence number, in order to improve a flushing efficiency of the transaction updates.

11. A system, comprising:
a processor; and
a memory containing an application configured to perform an operation for implementing a partial-blocking consistency point in a database system, the operation comprising:
identifying a plurality of transaction updates with a consistency point ID associated with a consistency point sequence number,
recording a plurality of consistency point data that identify a location of the partial-blocking consistency point associated with the consistency point sequence number,
incrementing the consistency point sequence number,
flushing, to a non-volatile storage, the transaction updates identified with the consistency point sequence number, without blocking transaction activity,
while flushing the transaction updates identified with the consistency point sequence number:
receiving at least a first transaction update, wherein the first transaction update modifies a fist page not modified prior to the recording of the consistency point data of the partial-blocking consistency point,
stamping the first page with the incremented consistency point sequence number,
receiving at least a second transaction update, wherein the second transaction update modifies a second page previously modified prior to the recording of the consistency point data of the partial-blocking consistency point,
flagging the second page to be flushed as part of flushing the transaction updates identified with the consistency point sequence number, and
stamping the second page with the incremented consistency point sequence number; and
hardening, to the non-volatile storage, the recorded partial-blocking consistency point so that a plurality of data associated with the recorded partial-blocking consistency point can be recovered.

12. The system of claim 11, wherein hardening the recorded partial-blocking consistency point includes allowing the transaction activity to proceed without interruption.

13. The system of claim 11, wherein the operation further comprises incrementing the consistency point sequence number each time the partial-blocking consistency point is recorded.

14. The system of claim 11, wherein incrementing the consistency point sequence number includes uniquely identifying the partial-blocking consistency point.

15. The system of claim 11, wherein incrementing the consistency point sequence number includes uniquely identifying the transaction updates associated with the partial-blocking consistency point.

16. The system of claim 11, wherein the operation further comprises processing the transaction updates identified with the consistency point sequence number, in order to improve a flushing efficiency of the transaction updates.

* * * * *